United States Patent
Ryan et al.

(10) Patent No.: US 10,792,666 B2
(45) Date of Patent: Oct. 6, 2020

(54) COMBINED MULCHER AND CHIPPER ATTACHMENT

(71) Applicant: Ryan's Equipment, Inc., Edmore, MI (US)

(72) Inventors: Don Ryan, Sheridan, MI (US); John Amland, Mount Pleasant, MI (US)

(73) Assignee: Ryan's Equipment, Inc., Edmore, MI (US)

( * ) Notice: Subject to any disclaimer, the term of this patent is extended or adjusted under 35 U.S.C. 154(b) by 261 days.

(21) Appl. No.: 15/950,522

(22) Filed: Apr. 11, 2018

(65) Prior Publication Data
US 2019/0314825 A1    Oct. 17, 2019

(51) Int. Cl.
| | |
|---|---|
| B02C 18/18 | (2006.01) |
| B27L 11/00 | (2006.01) |
| A01G 3/00 | (2006.01) |
| B02C 21/02 | (2006.01) |
| B27L 11/02 | (2006.01) |

(52) U.S. Cl.
CPC .............. *B02C 18/18* (2013.01); *A01G 3/002* (2013.01); *B02C 21/02* (2013.01); *B27L 11/002* (2013.01); *B27L 11/02* (2013.01)

(58) Field of Classification Search
CPC .... A01G 23/08; A01G 23/081; A01G 23/093; A01G 23/06; A01G 23/067; B27B 5/10; B27B 11/12; B02C 21/02; B02C 21/026; B02C 2021/023; A01D 34/64; A01D 34/645; A01D 34/661; A01D 34/662; B27L 11/00; B27L 11/005; B27L 11/02; B27L 11/04
See application file for complete search history.

(56) References Cited

U.S. PATENT DOCUMENTS

| | | |
|---|---|---|
| 3,661,333 A | 5/1972 | Smith |
| 3,818,957 A | 6/1974 | Schoonover |
| 4,057,192 A | 11/1977 | Smith |

(Continued)

FOREIGN PATENT DOCUMENTS

WO    2006050259 A1    5/2006

OTHER PUBLICATIONS http://www.loftness.com/products/vegetation-management/mulching-heads/bad-ax-skid-steer/overview/; visited Apr. 4, 2018.

(Continued)

*Primary Examiner* — Matthew Katcoff
(74) *Attorney, Agent, or Firm* — Quinn IP Law

(57) ABSTRACT

A mulching and chipping attachment includes a deck having a top plate. A cutting disk is attached to the deck. The top plate includes an opening that exposes a portion of the cutting disk. A guide chute is attached to the deck, and is disposed over the opening. The guide chute includes a feed system. The feed system includes a first roller, and a reactionary member operable to react against the first roller to secure a log therebetween. The first roller and the reactionary member cooperate together to grasp and controllably feed the log through the opening. The first roller or the reactionary member may be moveable relative to the other, to adjust a throat distance therebetween. An anvil may be disposed at a rearward edge of the opening, and extend downward to define a chip cutting height between the anvil and the cutting disk.

44 Claims, 6 Drawing Sheets

(56) References Cited

U.S. PATENT DOCUMENTS

| | | | |
|---|---|---|---|
| 4,160,471 A | | 7/1979 | Lapointe |
| 4,338,985 A | | 7/1982 | Smith et al. |
| 7,748,421 B2 | | 7/2010 | Everett |
| 7,954,736 B2 | * | 6/2011 | Kallenbach ......... B02C 18/2283 |
| | | | 241/34 |
| 8,739,843 B2 | | 6/2014 | Helmsderfer et al. |
| 9,585,314 B2 | | 3/2017 | Sulman |
| 2010/0313998 A1 | * | 12/2010 | Lebreux ............... A01G 23/067 |
| | | | 144/4.1 |
| 2017/0057117 A1 | | 3/2017 | Windrim et al. |

OTHER PUBLICATIONS

SS Eco Skid Steer Forestry Mulcher Spec Sheet, Advanced Forest Equipment, Hayden, ID, accessed Apr. 4, 2018.
Diamond Mowers Skid-Steer Forestry Mulcher Spec Sheet, Sioux Falls, SD, accessed Apr. 4, 2018.

* cited by examiner

US 10,792,666 B2

COMBINED MULCHER AND CHIPPER ATTACHMENT

TECHNICAL FIELD

The disclosure generally relates to a mulching and chipping attachment that is mountable to a machine.

BACKGROUND

Forestry clearing operations often include the cutting, chipping, and mulching of vegetation, such as but not limited to trees and brush. Many types of moveable machinery may be equipped with an attachment for chipping and/or mulching various types of vegetation. For example, a mulching and chipping attachment may be attached to a skid steer, an excavator, or other similar piece of machinery that is particularly well suited for traversing uneven ground surfaces to be cleared.

SUMMARY

A mulching and chipping attachment is provided. The mulching and chipping attachment includes a deck having a top plate. The top plate of the deck includes an upper surface and an opposing lower surface. A cutting disk is rotatably attached to the deck adjacent to the lower surface of the deck. The cutting disk includes a top surface facing the lower surface of the deck, and an opposing bottom surface positioned for engaging vegetation disposed on a ground surface. The cutting disk may include upper cutting elements on the top surface of the cutting disk, lower cutting elements on the lower surface of the cutting disk, and edge cutting elements disposed on a peripheral edge of the cutting disk. A disk motor is coupled to the cutting disk. The disk motor is operable to rotate the cutting disk about a central axis. The top plate includes an opening laterally offset from the central axis. The opening in the top plate exposes a portion of the top surface of the cutting disk. A guide chute is attached to the deck, and is disposed over the opening in the top plate. The guide chute is shaped to guide a log, branches, brush, or similar vegetative materials through the opening in the top plate and into engagement with the top surface of the cutting disk. The log, branches, brush, or other vegetative matter is hereinafter referred to and generally described as a log. The guide chute may include a feed system. The feed system includes a first roller, and a reactionary member. The first roller is rotatably mounted to the guide chute for rotation about a first roller axis. A first roller motor is coupled to the first roller. The first roller motor is operable to rotate the first roller about the first roller axis. The reactionary member is disposed opposite the first roller. The reactionary member is operable to react against the first roller to secure a log therebetween. The reactionary member may include, but is not limited to, a second roller or a skid plate. The first roller and the reactionary member cooperate together to grasp and controllably feed the log through the opening in the top plate. At least one of the first roller and the reactionary member may be moveable relative to the other of the first roller and the reactionary member, to adjust a throat distance between the first roller and the reactionary member. While the exemplary embodiment described herein and shown in the Figures includes the first roller and the reactionary member positioned in a generally horizontal orientation, it should be appreciated that other embodiments may include the first roller and the reactionary member positioned in a generally vertical orientation. An anvil may be disposed at a rearward edge of the opening in the top plate. The anvil extends downward below the lower surface of the top plate to define a chip cutting height between a lower edge of the anvil and the top surface of the cutting disk.

Accordingly, the mulching and chipping attachment described herein is capable of mulching and chipping surface vegetation using the lower cutting elements of the cutting disk, as well as cutting down trees and brush using the edge cutting elements of the cutting disk. Additionally, the mulching and chipping attachment is capable of grasping and feeding a felled tree, i.e., a log, through the opening in the top plate, using the guide chute and feed system. The guide chute and the feed system feed the logs into the upper cutting elements on the cutting disk at a controlled feed rate, and at an angle relative to the cutting disk. The upper cutting elements mulch and chip the logs to a desired chip height and/or size, which is controlled by the distance between the upper cutting elements and the anvil, as well as the speed at which the feed system feeds the log into the cutting disk. By using the feed system and the guide chute, the mulching and chipping attachment can process logs of a large diameter, in a safe and convenient process, and provide a more consistently sized mulch product. By controlling the rate at which the log is fed into the cutting disk, using the feed system, the discharge of mulch product from the mulching and chipping attachment is also controlled.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
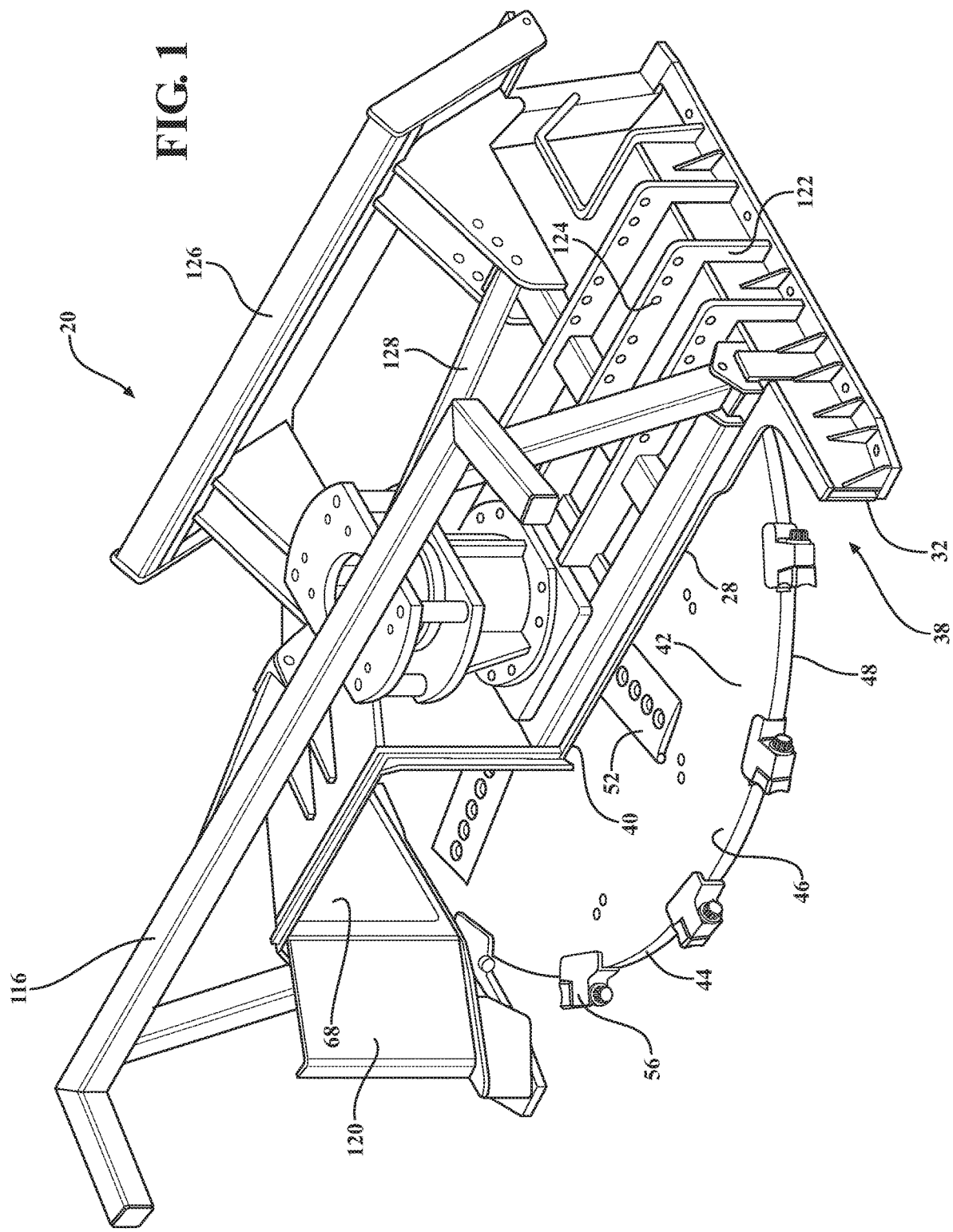
FIG. 1 is a schematic perspective view of a mulching and chipping attachment.

Referring to the Figures, wherein like numerals indicate like parts throughout the several views, a mulching and chipping attachment is generally shown at 20, and referred to throughout the remainder of the detailed description by the reference numeral 20. The mulching and chipping attachment 20 may be attached to a machine, such as but not limited to a skid steer, a compact track loader, an excavator, a mini-excavator, an articulated wheel loader, etc. As shown in FIG. 1, the mulching and chipping attachment 20 may include one or more plates 122 positioned at different locations to present a plurality of holes 124, which may be used to mount the mulching and chipping attachment 20 to different types and configurations of machines. Alternatively, a universal skid steer mount 126 may be attached to the mulching and chipping attachment 20, and used to mount the attachment 20 to the operating machine. The specific type and configuration of the machine, and the manner in which the mulching and chipping attachment 20 is attached to the machine are not pertinent to the teachings of this disclosure, are well understood by those skilled in the art, and are therefore not described in detail herein.

Figure 2:
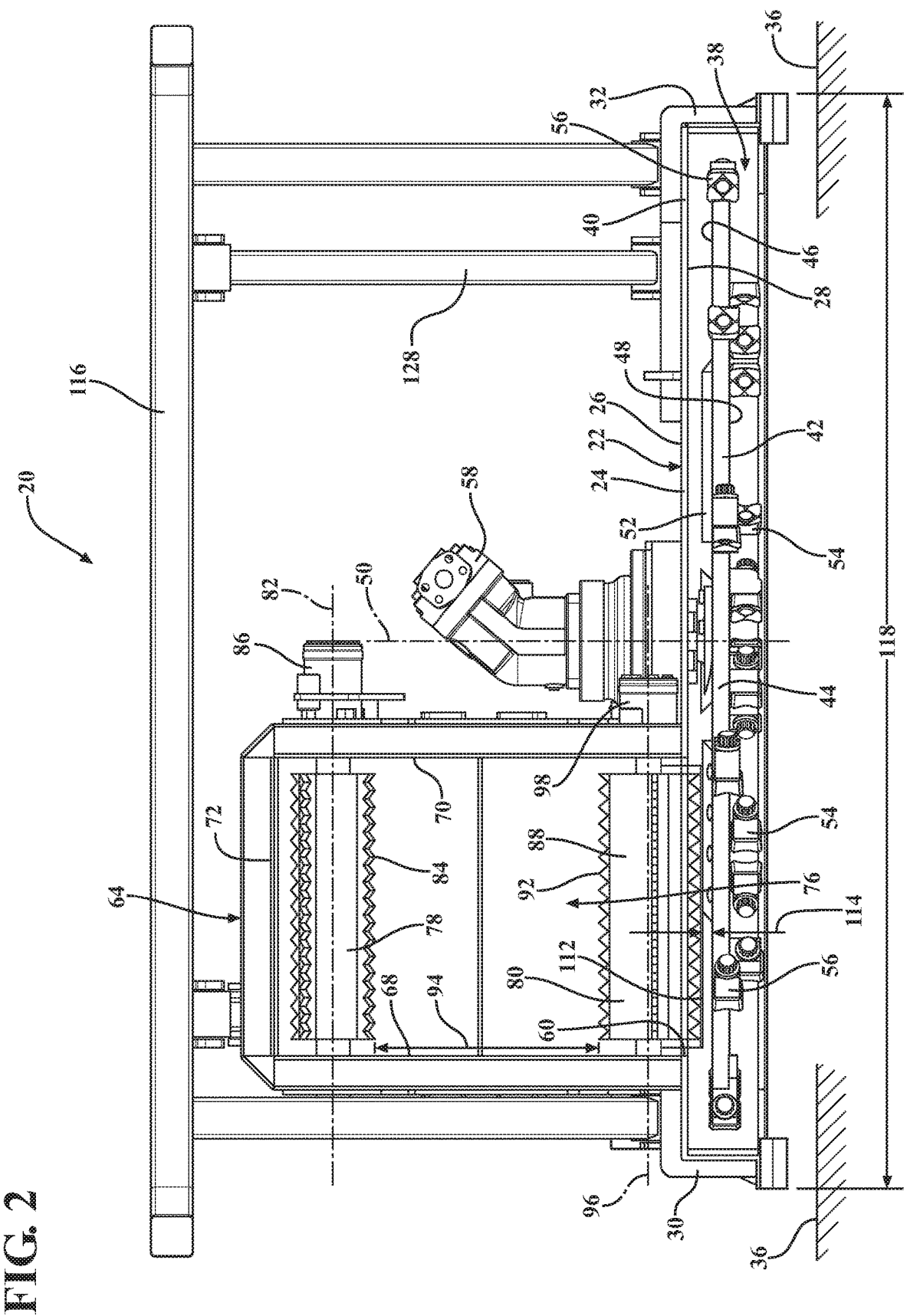
FIG. 2 is a schematic front view of the mulching and chipping attachment.
Figure 3:
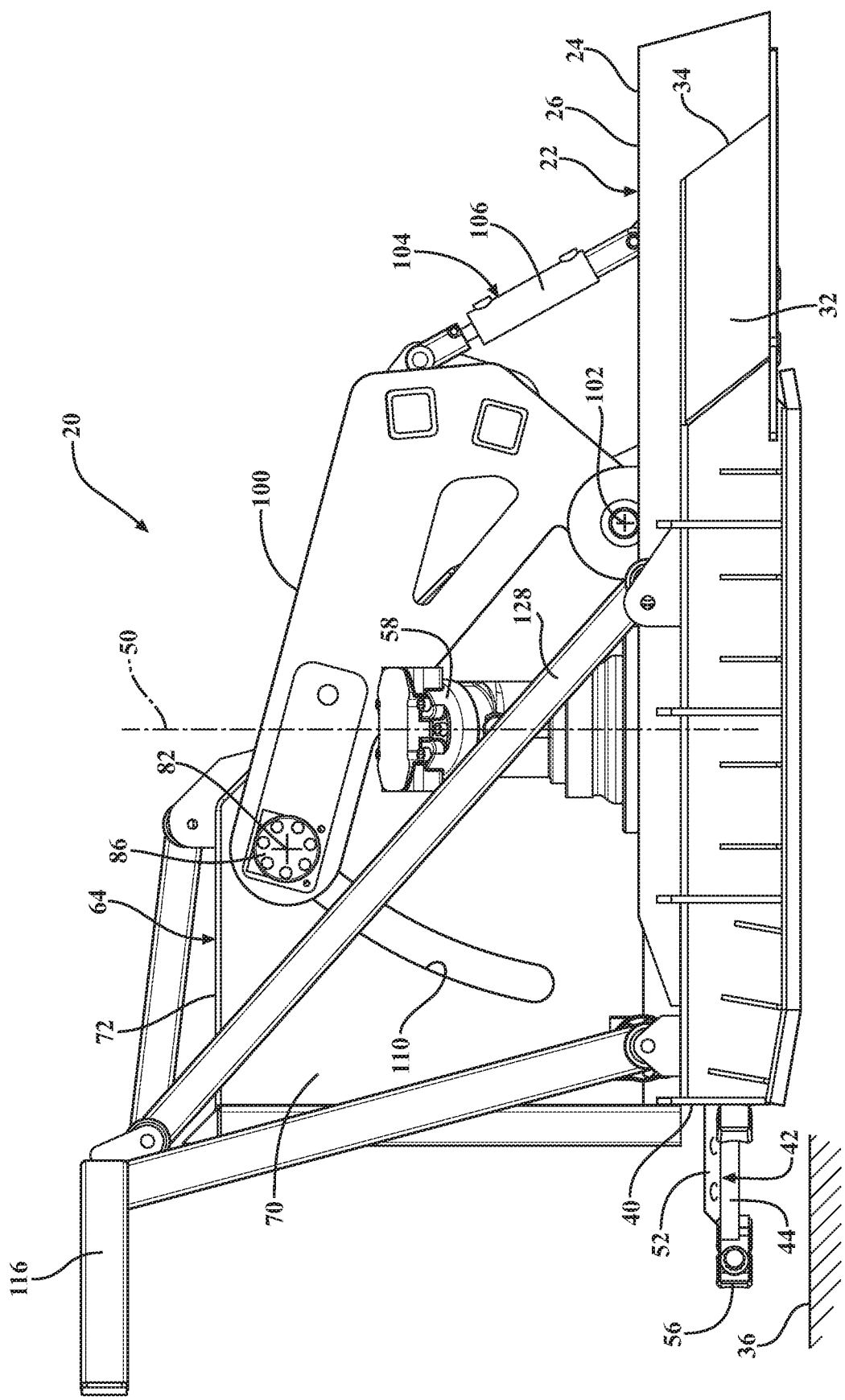
FIG. 3 is a schematic side view of the mulching and chipping attachment.

Referring to FIGS. 1-3, the mulching and chipping attachment 20 includes a deck 22. The deck 22 includes a top plate 24 having an upper surface 26, and an opposing lower surface 28. The deck 22 further includes a first edge wall 30, a second edge wall 32, and a rear edge wall 34. The first edge wall 30, the second edge wall 32, and the rear edge wall 34 extend downward from the top plate 24, toward a ground surface 36, and cooperate to form a pocket 38 adjacent the lower surface 28 of the top plate 24. The deck 22 includes a front or forward edge 40. The pocket 38 is open along the forward edge 40 of the deck 22. It should be appreciated that when attached to a skid steer, compact track loader, similar forward advancing machine, or boom mounted to a machine similar to an excavator, the mulching and chipping attachment 20 is attached at or near the rear edge wall 34 of the deck 22, such that the open end of the pocket 38 disposed along the forward edge 40 of the deck 22 is advanced into the vegetation. Accordingly, the forward edge 40 of the top plate 24 may be considered the front of the mulching and chipping attachment 20, whereas the rear edge wall 34 of the deck 22 may be considered the back of the mulching and chipping attachment 20.

A cutting disk 42 is rotatably attached to the deck 22, within the pocket 38 and adjacent the lower surface 28 of the deck 22. The cutting disk 42 may be attached to the deck 22 in any suitable manner, and may include other components interconnecting the cutting disk 42 and the deck 22. For example, the cutting disk 42 may be indirectly attached to the deck 22 using bearings and other support plates. Alternatively, the cutting disk 42 may be directly connected to an output shaft of a motor, which is in turn connected to the deck 22. The specific manner in which the cutting disk 42 is attached to the deck 22 is not pertinent to the teachings of this disclosure, are well known to those skilled in the art, and are therefore not described in greater detail herein. At least a portion of the cutting disk 42 extends outward past the forward edge 40 of the top plate 24, and forward from the deck 22, so that an outer periphery 44 of the cutting disk 42 may engage vegetation.

The cutting disk 42 includes a top surface 46 and an opposing bottom surface 48. The top surface 46 of the cutting disk 42 faces the lower surface 28 of the deck 22. The bottom surface 48 of the cutting disk 42 is positioned to face the ground surface 36. The cutting disk 42 is a generally circular plate that is disposed on a primary plane. The primary plane of the cutting disk 42 is generally parallel with the top plate 24 of the deck 22. The cutting disk 42 is spaced downward from the lower surface 28 of the top plate 24, to define a space or gap between the cutting disk 42 and the top plate 24. The cutting disk 42 includes a central axis 50 that is perpendicular to the primary plane of the cutting disk 42. The cutting disk 42 is rotatable about the central axis 50 of the cutting disk 42.

Figure 5:
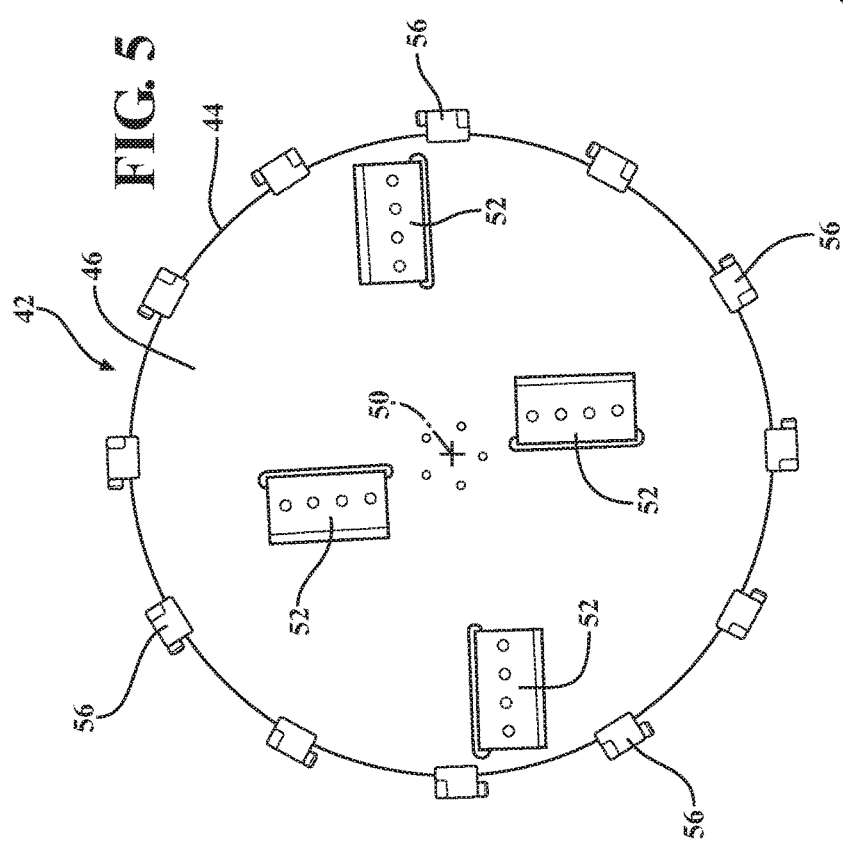
FIG. 5 is a schematic top plan view of a cutting disk of the mulching and chipping attachment.

The exemplary embodiment of the cutting disk 42 includes at least one, and preferably a plurality of upper cutting elements 52. The upper cutting elements 52 are attached to the top surface 46 of the cutting disk 42, and extend upward from the top surface 46 of the cutting disk 42. The upper cutting elements 52 may include any style and/or configuration of device suitable for mulching and/or chipping vegetation. For example, the upper cutting elements 52 may include, but are not limited to, cutting teeth and/or blades. For example, referring to FIG. 5, the top surface 46 of the cutting disk 42 is shown including a plurality of cutting blades arranged in a radial configuration. It should be appreciated that the shape, style, and radial configuration of the upper cutting elements 52 shown in the Figures, is merely exemplary, and that the shape, style, and configuration of the upper cutting elements 52 may vary from the exemplary embodiment shown and described herein.

Figure 6:
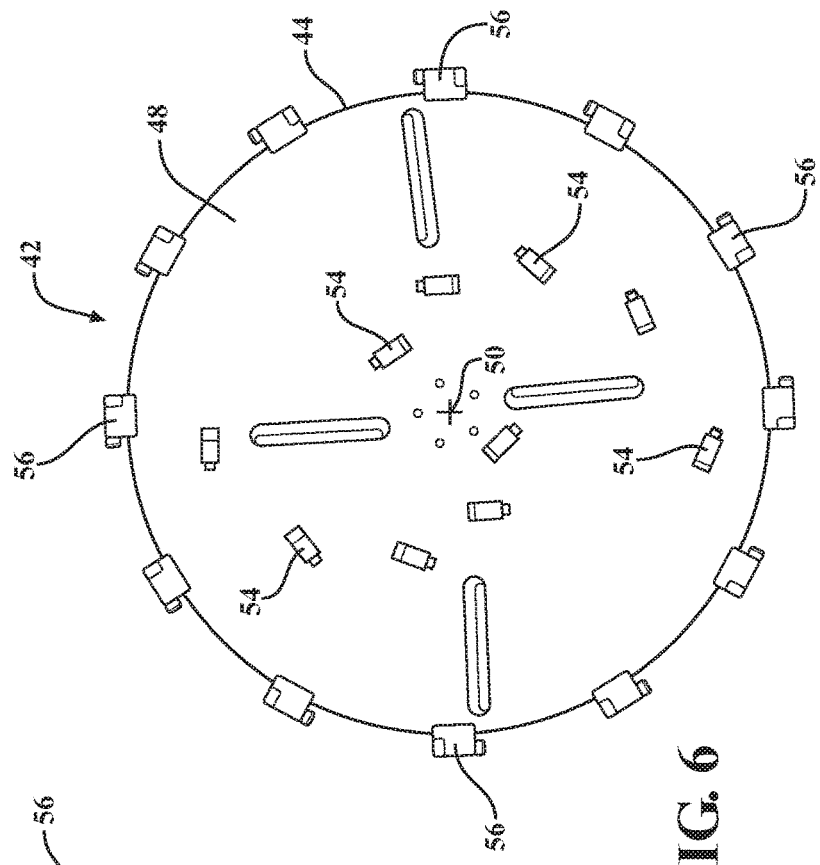
FIG. 6 is a schematic bottom plan view of the cutting disk of the mulching and chipping attachment.

The exemplary embodiment of the cutting disk 42 includes at least one, and preferably a plurality of lower cutting elements 54. The lower cutting elements 54 are attached to the bottom surface 48 of the cutting disk 42, and extend downward from the bottom surface 48 of the cutting disk 42. The lower cutting elements 54 may include any style and/or configuration of device suitable for mulching and/or chipping vegetation. For example, the lower cutting elements 54 may include, but are not limited to, cutting teeth and/or blades. For example, referring to FIG. 6, the bottom surface 48 of the cutting disk 42 is shown including a plurality of cutting teeth arranged in a spiral configuration. It should be appreciated that the shape, style, and radial configuration of the lower cutting elements 54 shown in the Figures, is merely exemplary, and that the shape, style, and configuration of the lower cutting elements 54 may vary from the exemplary embodiment shown and described herein.

The exemplary embodiment of the cutting disk 42 may further include at least one, and preferably a plurality of edge cutting elements 56. The edge cutting elements 56 are attached to the outer periphery 44 of the cutting disk 42, and extend radially outward from the outer periphery 44. The edge cutting elements 56 may include any style and/or configuration of device suitable for mulching, chipping, and/or cutting vegetation. For example, the edge cutting elements 56 may include, but are not limited to, cutting teeth and/or blades. For example, referring to FIGS. 5 and 6, the edge cutting elements 56 are shown as cutting teeth. It should be appreciated that the shape, style, and radial configuration of the edge cutting elements 56 shown in the Figures, is merely exemplary, and that the shape, style, and configuration of the edge cutting elements 56 may vary from the exemplary embodiment shown and described herein.

Referring to FIGS. 1-3, a disk motor 58 is coupled to the cutting disk 42. The disk motor 58 is operable to rotate the cutting disk 42 about the central axis 50. In the exemplary embodiment shown in the Figures and described herein, the disk motor 58 is a hydraulic motor directly coupled to the cutting disk 42. For example, the disk motor 58 may include an output shaft (not shown) that is connected to the cutting disk 42 to directly rotate the cutting disk 42. The hydraulic motor is driven by a flow of a hydraulic fluid supplied from the associated machine, as is understood by those skilled in the art. However, in other embodiments, the disk motor 58 may be remotely located from the cutting disk 42, and indirectly connected to the cutting disk 42 with a drive shaft or other similar device. Additionally, the disk motor 58 may include some other type of motor, such as an electric motor for example. As such, the disk motor 58 should not be limited to the hydraulic motor described in the exemplary embodiment.

The top plate 24 includes an opening 60. In the exemplary embodiment shown in the Figures, the opening 60 is laterally offset from the central axis 50, and is generally disposed between the first edge wall 30 and the central axis 50. As shown in the Figures, the exemplary embodiment of the mulching and chipping attachment 20 includes the cutting disk 42 configured for clockwise rotation when viewed from above. However, it should be appreciated that the opening 60 may be positioned at other locations on the top plate 24. For example, in other embodiments, the opening 60 may be lateral offset from the central axis 50, and be generally disposed between the second edge wall 32 and the central axis 50, with the cutting disk 42 configured for counter-clockwise rotation when viewed from above. The opening 60 in the top plate 24 exposes a portion of the top surface 46 of the cutting disk 42. The exemplary embodiment shown in the Figures includes the opening 60 configured as a generally rectangular opening 60 in the top plate 24. However, the opening 60 may be configured to include some other generally non-rectangular shape. The opening 60 includes a rearward edge 62 that is spaced rearward of the forward edge 40 of the top plate 24.

Figure 4:
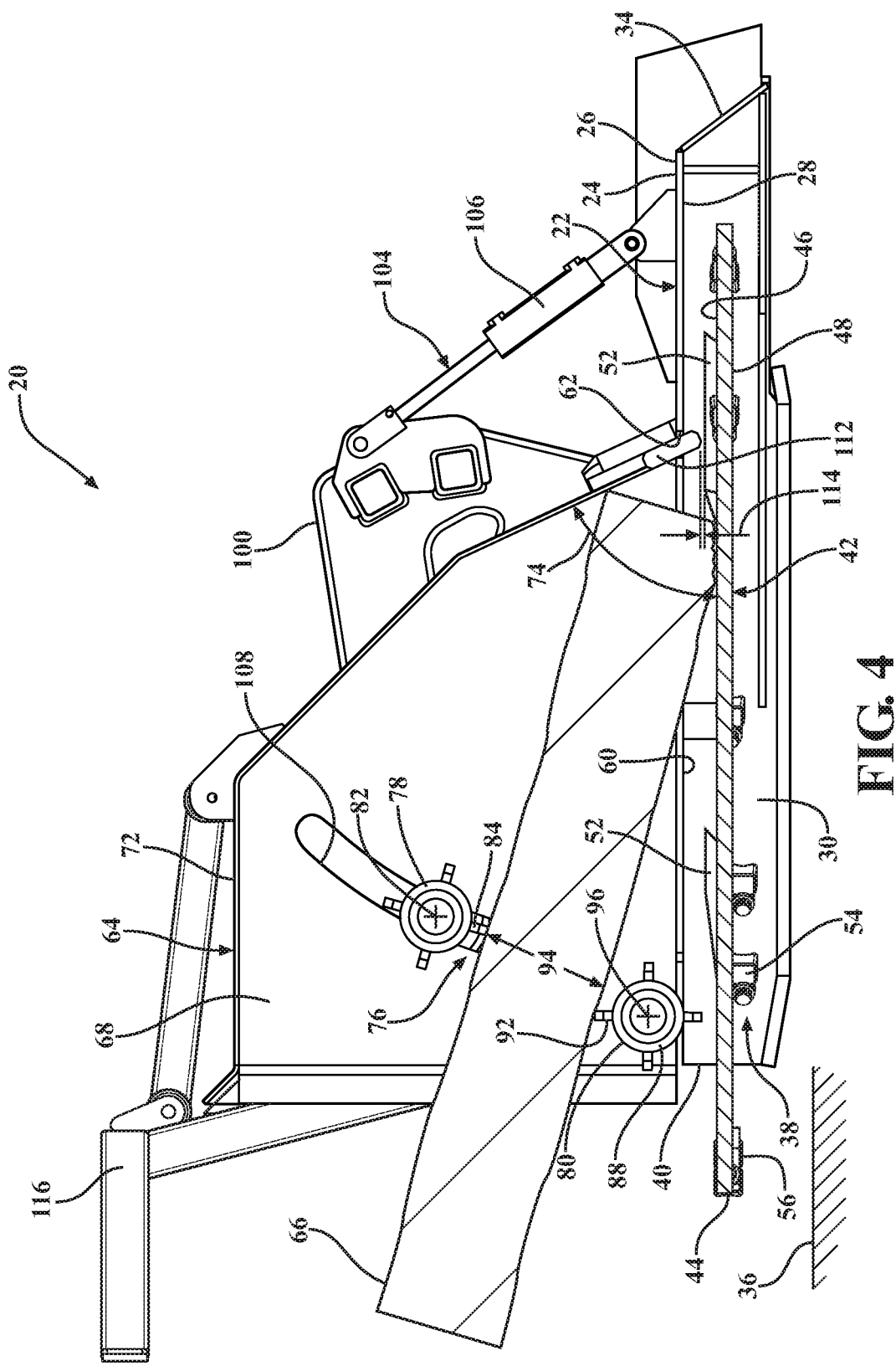
FIG. 4 is a schematic cross sectional view of the mulching and chipping attachment.

A guide chute 64 is attached to the deck 22. The guide chute 64 is generally disposed over the opening 60 in the top plate 24. Referring to FIG. 4, the guide chute 64 is shaped to guide a log 66 through the opening 60 in the top plate 24 and into engagement with the top surface 46 of the cutting disk 42. The guide chute 64 includes a first side wall 68, a second side wall 70, and a top wall 72. The guide chute 64 is open adjacent the forward edge 40 of the top plate 24, such that the open end of the guide chute 64 may be advanced over an end of the log 66 so that the log 66 enters the guide chute 64 through the open end of the guide chute 64. At least a portion of the top wall 72 is angled relative to the cutting disk 42 to form an acute angle 74 between the top wall 72 of the guide chute 64 and the top surface 46 of the cutting disk 42. The angled portion of the top wall 72 helps guide the log 66 into the cutting disk 42 so that the log 66 engages the cutting disk 42 at an angle appropriate for the upper cutting elements 52 to engage the log 66 for chipping and mulching of the log 66. Referring to FIG. 1, the guide chute 64 may include a scoop 120 that extends forward of the forward edge 40. The scoop 120 is configured to help guide the log 66 into the guide chute 64.

Referring to FIGS. 1, 2, and 4, the guide chute 64 includes a feed system 76. The feed system 76 is operable to grasp and controllably feed the log 66 through the opening 60 in the top plate 24, and into engagement with the cutting disk 42. The feed system includes a first roller 78, and a reactionary member 80. The first roller 78 is rotatably mounted to the guide chute 64 for rotation about a first roller axis 82. The first roller axis 82 is generally parallel with the forward edge 40 of the top plate 24, and is generally parallel with the primary plane of the cutting disk 42. The first roller 78 may include a plurality of gripping elements 84 configured to grasp the log 66.

A first roller motor 86 may be coupled to the first roller 78 for rotating the first roller 78 about the first roller axis 82. In the exemplary embodiment shown in the Figures and described herein, the first roller motor 86 is a hydraulic motor directly coupled to the first roller 78. For example, the first roller motor 86 may include an output shaft (not shown) that is connected to the roller to directly rotate the first roller 78. The hydraulic motor is driven by a flow of a hydraulic fluid supplied from the associated machine, as is understood by those skilled in the art. However, in other embodiments, the first roller motor 86 may be remotely located from the first roller 78, and indirectly connected to the first roller 78 with a drive shaft or other similar device. Additionally, the first roller motor 86 may include some other type of motor, such as but not limited to an electric motor. As such, the first roller motor 86 should not be limited to the hydraulic motor described in the exemplary embodiment.

The reactionary member 80 is disposed opposite and spaced from the first roller 78. The reactionary member 80 is operable to react against the first roller 78 to secure the log 66 therebetween. As shown in the Figures, the exemplary embodiment of the feed system 76 includes the first roller 78 disposed above the reactionary member 80, near the top wall 72 of the guide chute 64. The reactionary member 80 is disposed below the first roller 78, near the top plate 24 of the deck 22. However, in other embodiments, it should be appreciated that the relative positions of the first roller 78 and the reactionary member 80 may be reversed, with the first roller 78 disposed adjacent the top plate 24 of the deck 22, and the reactionary member 80 disposed adjacent the top wall 72 of the guide chute 64.

Figure 7:
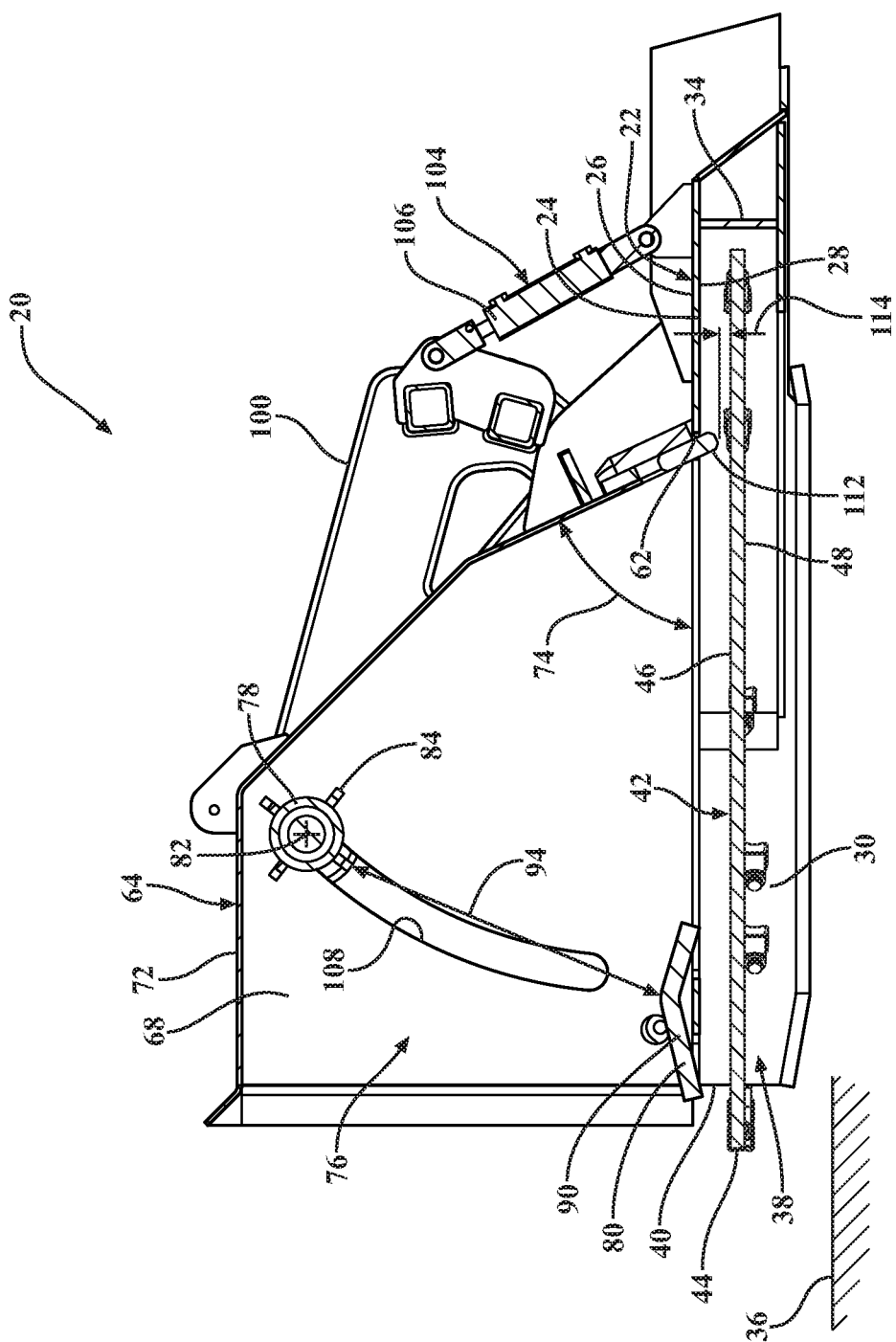
FIG. 7 is a schematic cross sectional view of an alternative embodiment of the mulching and chipping attachment.

As shown in FIGS. 1, 2, and 4, the reactionary member 80 includes a second roller 88. However, in other embodiments, such as shown in FIG. 7, the reactionary member 80 may include a skid plate 90 or other similar structure. Referring to FIGS. 1, 2, and 4, the reactionary member 80 is described as the second roller 88. The second roller 88 may include a plurality of gripping elements 92 configured to grasp the log 66. The second roller 88 is disposed parallel with and spaced from the first roller 78 to define a throat distance 94 between the first roller 78 and the second roller 88. The second roller 88 is rotatably mounted to the guide chute 64 for rotation about a second roller axis 96. The second roller axis 96 is generally parallel with the forward edge 40 of the top plate 24, and is generally parallel with the primary plane of the cutting disk 42, as well as the first roller axis 82.

In the exemplary embodiment shown and described herein, the feed system 76 includes a second roller motor 98 that is coupled to the second roller 88 for rotating the second roller 88 about the second roller axis 96. However, other embodiments need not include the second roller motor 98, allowing the second roller 88 to freewheel. In the exemplary embodiment shown in the Figures and described herein, the second roller motor 98 is a hydraulic motor directly coupled to the second roller 88. For example, the second roller motor 98 may include an output shaft (not shown) that is connected to the second roller 88 to directly rotate the second roller 88. The hydraulic motor is driven by a flow of a hydraulic fluid supplied from the associated machine, as is understood by those skilled in the art. However, in other embodiments, the second roller motor 98 may be remotely located from the second roller 88, and indirectly connected to the second roller 88 with a drive shaft or other similar device. Additionally, the second roller motor 98 may include some other type of motor, such as but not limited to an electric motor. As such, the second roller motor 98 should not be limited to the hydraulic motor described in the exemplary embodiment.

In the exemplary embodiment described herein, the first roller motor 86 and the second roller motor 98 rotate in unison in opposite rotational directions. Furthermore, the first roller motor 86 and the second roller motor 98 are coordinated to rotate at a common rotational speed. The rotational speed of the first roller 78 and the second roller 88 controls a speed at which the log 66 is fed into the cutting disk 42, i.e., a log feed rate. By slowing the rotational speed of the first roller 78 and the second roller 88 respectively, the log feed rate is reduced, which enables better control of the chipping and mulching of the log 66, as well as better control of the debris produced. By increasing the rotational speed of the first roller 78 and the second roller 88 respectively, the log feed rate is increased, which increases the speed at which the log 66 is reduced to debris. The rotational speed of the first roller motor 86 and the second roller motor 98 may be controlled, for example, by the amount of hydraulic fluid supplied to the first roller motor 86 and the second roller motor 98 respectively. It should be appreciated that the associated machine may be equipped with suitable control features to control the fluid flow to auxiliary ports, such as would be used to feed the first roller motor 86 and the second roller motor 98 respectively. An operator of the machine may then be able to increase or reduce the rotational speed of the first roller motor 86 and the second roller motor 98 to control the log feed rate. Additionally, it is contemplated that a direction of rotation of the first roller motor and/or the second roller motor may be selectively reversed by the operator of the machine, thereby enabling removal of the log 66 from the guide chute 64.

As noted above, the first roller 78 and the reactionary member 80, e.g., the second roller 88 shown in FIGS. 1, 2, and 4, are spaced apart from each other to define the throat distance 94 therebetween, best shown in FIG. 2. In the exemplary embodiment shown and described herein, at least one of the first roller 78 and the reactionary member 80 is moveable relative to the other of the first roller 78 and the reactionary member 80 to adjust the throat distance 94 between the first roller 78 and the reactionary member 80. As shown in the Figures and described herein, the first roller 78 is positioned adjacent the top wall 72 of the guide chute 64, and is moveable relative to the reactionary member 80, e.g., the second roller 88. However, in other embodiments, it should be appreciated that the relative positions may be reversed, with the reactionary member 80 disposed near the top plate 24 of the deck 22 being moveable relative to the first roller 78 disposed adjacent the top wall 72 of the guide chute 64.

One of the first roller 78 and the reactionary member 80 may be moved relative to the other in any suitable manner. For example, and as shown in the Exemplary embodiment of the Figures, the guide chute 64 includes an adjustment bracket 100 that is attached to and supports the first roller 78. Referring to FIG. 3, the adjustment bracket 100 is rotatably attached to the deck 22 for rotation about a bracket axis 102. The adjustment bracket 100 may be rotatably attached to the deck 22 in any suitable manner. The adjustment bracket 100 extends from the bracket axis 102 to a distal end, which supports the first roller 78 and the first roller motor 86. The guide chute 64 includes an adjustment mechanism 104 that is attached to the adjustment bracket 100. The adjustment mechanism 104 may include any mechanism that is operable to rotate the adjustment bracket 100 about the bracket axis 102. For example, the adjustment mechanism 104 may include, but is not limited to, a selectively extendable and retractable device 106. The selectively extendable and retractable device 106 may include, but is not limited to, a hydraulically actuated piston. The associated machine may include a control valve operable to supply hydraulic fluid to the selectively extendable and retractable device 106 to adjust a length of the piston, as is understood by those skilled in the art. However, in other embodiments, the selectively extendable and retractable device 106 may include an electrically actuated piston, such as but not limited to, an electrically actuated jack screw, or other similar device. In yet other embodiments, the selectively extendable and retractable device 106 may include a cylinder, a spring, or some other device capable of extending and/or retracting to change a length of the selectively extendable and retractable device 106.

Referring to FIG. 1, the first side wall 68 of the guide chute 64 includes a first guide slot 108, and the second side wall 70 of the guide chute 64 includes a second guide slot 110 disposed opposite the first guide slot 108. In the exemplary embodiment shown and described herein, each of the first guide slot 108 and the second guide slot 110 includes an arcuate shape defining an arcuate path for movement of the first roller 78. The first roller 78 extends through each of the first guide slot 108 and the second guide slot 110. The first roller 78 is moveable relative to the first side wall 68 and the second side wall 70 along and within the first guide slot 108 and the second guide slot 110 respectively. As such, the first guide slot 108 and the second guide slot 110 guide the movement of the first roller 78. Lengthening or shortening of the selectively extendable and retractable device 106 causes the adjustment bracket 100 to rotate about the bracket axis 102, which in turn moves the first roller 78 within the first guide slot 108 and the second guide slot 110 to adjust the throat distance 94. An operator may control the extendable and retractable device 106 to move the first roller 78 into or out of pressing engagement with the log 66.

Referring to FIG. 4, the mulching and chipping attachment 20 may further include an anvil 112. The anvil 112 is disposed at the rearward edge 62 of the opening 60 in the top plate 24. The anvil 112 extends downward below the lower surface 28 of the top plate 24 to define a chip cutting height 114 between a lower edge of the anvil 112, and a cutting edge of the upper cutting elements 52. The anvil 112 may include a bar or plate that extends across the rearward edge 62 of the opening 60. As shown in FIG. 4, the anvil 112 may be selectively repositionable relative to the cutting disk 42 to adjust the chip cutting height 114. For example, the anvil 112 may be bolted to the guide chute 64 at different locations to adjust the chip cutting height 114. By decreasing the chip cutting height 114, the log 66 is processed into smaller and finer pieces, but may require a slower log feed rate. Increasing the chip cutting height 114 increases the processed debris size, but may allow for an increased log feed rate.

Referring to FIGS. 1-4, the exemplary embodiment of the mulching and chipping attachment 20 further includes a push rail 116. The push rail 116 is attached to the deck 22, and is disposed vertically above the upper surface 26 of the top plate 24, and forward of the forward edge 40 of the top plate 24. The push rail 116 extends generally parallel with the forward edge 40 of the top plate 24 and across a width 118 of the deck 22. The push rail 116 enables the associated machine to push over vegetation and help guide the vegetation into the pocket 38 and the cutting disk 42. As shown in FIG. 1, a rear support arm 128 of the push rail 116 may be mounted at different locations to change the forward position of the push rail 116. It should be appreciated that the push rail 116 may be mounted to the deck 22 in some other manner than the exemplary embodiment shown in the Figures and described herein.

In operation, the associated machine moves the mulching and chipping attachment 20 along the ground surface 36, with the cutting disk 42 positioned generally parallel with the ground surface 36. Small vegetation, such as small bushes and small diameter trees, may be pushed over and cut off using the edge cutting elements 56 on the outer periphery 44 of the cutting disk 42. The mulching and chipping attachment 20 may also be pushed over this smaller vegetation, so that the lower cutting elements 54 may process the vegetation into debris.

For larger vegetation, such as larger diameter trees, the mulching and chipping attachment 20 may be advanced into the trunk of the tree, such that edge cutting elements 56 cut the trunk of the tree, while the push rail 116 pushes the tree over. The operator of the machine may then move the mulching and chipping attachment 20 into position so that the guide chute 64 slides over an end of the tree trunk, i.e., the log 66, such that the first roller 78 and the reactionary member 80 are disposed on opposite sides of the log 66. As shown in FIG. 4, the operator of the machine may then engage the selectively extendable and retractable device 106 to move the first roller 78 downward into clamping and/or pressing engagement with the log 66, to secure the log 66 between the first roller 78 and the reactionary member 80, and position the log 66 in a suitable position for engaging the cutting disk 42, e.g., an angled position relative to the primary plane of the cutting disk 42. The operator of the machine may then engage the first roller motor 86, and optionally the second roller motor 98, to feed the log 66 into the cutting disk 42, through the opening 60 in the top plate 24, at the desired log feed rate. In some embodiments, the operator of the machine may control the rotational speed of the first roller motor 86 and optionally the second roller motor 98, to control or adjust the log feed rate into the cutting disk 42. The first roller 78 and the second roller 88 grasp and secure the log 66 as the log 66 is fed into the cutting disk 42, and prevent the cutting disk 42 from drawing the log 66 into the pocket 38 at an extremely high log feed rate, which may cause the log 66 to get jammed between the cutting disk 42 and the top plate 24, and stall the cutting disk 42. In some embodiments, the direction of rotation of the first roller motor 86 and the second roller motor 98 may be reversed, so that the log 66 may be removed or extracted from the guide chute 64. For example, a portion of the log 66 may be fed into the mulching and chipping attachment 20 to chip or mulch a portion of the log 66, at which time the operator may reverse the direction of the first roller motor 86 and the second roller motor 98 to remove the log 66 from the guide chute 64. The mulching and chipping attachment 20 may be sized to except and process large diameter logs, up to for example, 16" or 18" in diameter. The position of the anvil 112 may be adjusted to control the size of the debris created.

Once the log 66 has been cut and processed through the guide chute 64 to turn the log 66 into mulched debris, the operator of the machine may position the mulching and chipping attachment 20 vertically over the stump of the just cut and processed tree, and slowly move the mulching and chipping attachment 20 vertically downward, so that the lower cutting elements 54 may process the tree stump to an approximate elevation of the ground surface 36.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A mulching and chipping attachment for a machine, the mulching and chipping attachment comprising:
   a deck including a top plate having an upper surface and an opposing lower surface;
   a cutting disk rotatably attached to the deck adjacent to the lower surface of the top plate, and including a top surface facing the lower surface of the top plate, and an opposing bottom surface positioned for engaging vegetation disposed on a ground surface;
   wherein the top plate includes an opening exposing the top surface of the cutting disk;
   a guide chute attached to the deck and operable to guide a log through the opening in the top plate for engaging the top surface of the cutting disk;
   wherein the guide chute includes an anvil that extends downwardly from the top plate toward the top surface of the cutting disk to define a chip cutting height and
   wherein the anvil is selectively repositionable relative to the cutting disk to adjust the chip cutting height.

2. The mulching and chipping attachment set forth in claim 1, wherein the guide chute includes a feed system operable to grasp and controllably feed the log through the opening in the top plate.

3. The mulching and chipping attachment set forth in claim 2, wherein the feed system includes a first roller rotatably mounted to the guide chute for rotation about a first roller axis.

4. The mulching and chipping attachment set forth in claim 3, wherein the top plate includes a forward edge, and wherein the first roller axis is generally parallel with the forward edge of the top plate, and is generally parallel with a primary plane of the cutting disk.

5. The mulching and chipping attachment set forth in claim 3, wherein the feed system includes a first roller motor coupled to the first roller and operable to rotate the first roller about the first roller axis.

6. The mulching and chipping attachment set forth in claim 3, wherein the feed system includes a second roller rotatably mounted to the guide chute for rotation about a second roller axis.

7. The mulching and chipping attachment set forth in claim 6, wherein the top plate includes a forward edge, and wherein the second roller axis is generally parallel with the forward edge of the top plate, and is generally parallel with a primary plane of the cutting disk.

8. The mulching and chipping attachment set forth in claim 6, wherein at least one of the first roller and the second roller is moveable relative to the other one of the first roller and the second roller to adjust a throat distance between the first roller and the second roller.

9. The mulching and chipping attachment set forth in claim 8, wherein the guide chute includes an adjustment bracket attached to and supporting the first roller, and rotatable about a bracket axis.

10. The mulching and chipping attachment set forth in claim 9, wherein the guide chute includes an adjustment mechanism attached to the adjustment bracket and operable to rotate the adjustment bracket about the bracket axis.

11. The mulching and chipping attachment set forth in claim 10, wherein the adjustment mechanism includes a selectively extendable and retractable device.

12. The mulching and chipping attachment set forth in claim 9, wherein the guide chute includes a first side wall having a first guide slot, and a second side wall having a second guide slot disposed opposite the first guide slot, with the first roller extending through each of the first guide slot and the second guide slot, and with the first roller moveable relative to the first side wall and the second side wall along the first guide slot and the second guide slot respectively.

13. The mulching and chipping attachment set forth in claim 12, wherein each of the first guide slot and the second guide slot includes an arcuate shape defining an arcuate path for movement of the first roller.

14. The mulching and chipping attachment set forth in claim 6, wherein the feed system includes:
   a first roller motor coupled to the first roller and operable to rotate the first roller about the first roller axis; and
   a second roller motor coupled to the second roller and operable to rotate the second roller about the second roller axis.

15. The mulching and chipping attachment set forth in claim 14, wherein the first roller motor and the second roller motor are coordinated to rotate at a common rotational speed.

16. The mulching and chipping attachment set forth in claim 14, wherein the first roller motor and the second roller motor rotate in opposite rotational directions.

17. The mulching and chipping attachment set forth in claim 1, wherein the guide chute includes a first side wall, a second side wall, and a top wall.

18. The mulching and chipping attachment set forth in claim 17, wherein at least a portion of the top wall is angled relative to the cutting disk to form an acute angle between the top wall of the guide chute and the top surface of the cutting disk.

19. The mulching and chipping attachment set forth in claim 1, wherein the top plate includes a forward edge, and the opening in the top plate includes a rearward edge spaced from the forward edge of the top plate, and disposed generally parallel with the forward edge of the top plate, and wherein the anvil is disposed adjacent to the rearward edge of the opening and the chip cutting height is defined between a lower edge of the anvil and an upper cutting element disposed on the top surface of the cutting disk.

20. The mulching and chipping attachment set forth in claim 1, wherein the cutting disk is rotatable about a central axis of the cutting disk, and wherein the opening in the top plate is laterally offset from the central axis.

21. The mulching and chipping attachment set forth in claim 1, further comprising a disk motor coupled to the cutting disk and operable to rotate the cutting disk about a central axis.

22. The mulching and chipping attachment set forth in claim 1, wherein the cutting disk includes:
   at least one lower cutting element attached to the bottom surface of the cutting disk and extending downward from the bottom surface;
   at least one upper cutting element attached to the top surface of the cutting disk and extending upward from the top surface; and
   at least one edge cutting element attached to a circumferential edge of the cutting disk and extending radially outward from the circumferential edge.

23. The mulching and chipping attachment set forth in claim 22, wherein the at least one upper cutting element includes one of a knife or a tooth.

24. The mulching and chipping attachment set forth in claim 1, further comprising a push rail attached to the deck and disposed vertically above the upper surface of the top plate, and forward of a forward edge of the top plate.

25. The mulching and chipping attachment set forth in claim 24, wherein the push rail extends generally parallel with the forward edge of the top plate and across a width of the deck.

26. A mulching and chipping attachment comprising:
   a deck including a top plate having an upper surface and an opposing lower surface;
   a cutting disk rotatably attached to the deck adjacent to the lower surface of the top plate, and including a top surface facing the lower surface of the top plate, and an opposing bottom surface positioned for engaging vegetation disposed on a ground surface;
   a disk motor coupled to the cutting disk and operable to rotate the cutting disk about a central axis, wherein the disk motor is a hydraulic motor directly coupled to the cutting disk;
   wherein the top plate includes an opening laterally offset from the central axis and exposing the top surface of the cutting disk;
   a guide chute attached to the deck and disposed over the opening in the top plate, wherein the guide chute is shaped to guide a log through the opening in the top plate and into engagement with the top surface of the cutting disk;
   a first roller rotatably mounted to the guide chute for rotation about a first roller axis, and operable to grasp and controllably feed the log through the opening in the top plate;
   a first roller motor coupled to the first roller and operable to rotate the first roller about the first roller axis, wherein the first roller motor is a hydraulic motor directly coupled to the first roller;
   a reactionary member disposed opposite the first roller and operable to react against the first roller to secure the log therebetween;
   wherein at least one of the first roller and the reactionary member is moveable relative to the other one of the first roller and the reactionary member to adjust a throat distance between the first roller and the reactionary member; and
   an anvil disposed at a rearward edge of the opening in the top plate and extending downward below the lower surface of the top plate to define a chip cutting height between a lower edge of the anvil and the top surface of the cutting disk.

27. The mulching and chipping attachment set forth in claim 26, wherein the reactionary member includes a second roller disposed parallel with and spaced from the first roller.

28. The mulching and chipping attachment set forth in claim 27, further comprising a second roller motor coupled to the second roller and operable to rotate the second roller about a second roller axis, wherein the second roller motor is a hydraulic motor directly coupled to the second roller.

29. A mulching and chipping attachment for a machine, the mulching and chipping attachment comprising:
   a deck including a top plate having an upper surface and an opposing lower surface;
   a cutting disk rotatably attached to the deck adjacent to the lower surface of the top plate, and including a top surface facing the lower surface of the top plate, and an opposing bottom surface positioned for engaging vegetation disposed on a ground surface;
   wherein the top plate includes an opening exposing the top surface of the cutting disk;
   a guide chute attached to the deck and operable to guide a log through the opening in the top plate for engaging the top surface of the cutting disk;
   wherein the guide chute includes an anvil disposed adjacent to the opening and extends from the top plate toward the top surface of the cutting disk to define a chip cutting height between a lower edge of the anvil and an upper cutting element disposed on the top surface of the cutting disk; and
   wherein the anvil is selectively repositionable relative to the cutting disk to adjust the chip cutting height.

30. The mulching and chipping attachment set forth in claim 29, wherein the top plate includes a forward edge, and the opening in the top plate includes a rearward edge spaced from the forward edge of the top plate, and the anvil is disposed adjacent to the rearward edge of the opening.

31. The mulching and chipping attachment set forth in claim 29, wherein the anvil extends downwardly from the top plate toward the top surface of the cutting disk.

32. The mulching and chipping attachment set forth in claim 29, wherein the guide chute includes a feed system operable to grasp and controllably feed the log through the opening in the top plate.

33. The mulching and chipping attachment set forth in claim 32, wherein the feed system includes a first roller rotatably mounted to the guide chute.

34. The mulching and chipping attachment set forth in claim 33, wherein the feed system includes a second roller rotatably mounted to the guide chute, and wherein the first roller and the second roller are spaced from each other.

35. The mulching and chipping attachment set forth in claim 33, further comprising a reactionary member disposed opposite to the first roller and operable to react against the first roller to secure the log therebetween.

36. The mulching and chipping attachment set forth in claim 29, wherein the cutting disk is rotatable about a central axis, and wherein the opening in the top plate is laterally offset from the central axis.

37. A mulching and chipping attachment for a machine, the mulching and chipping attachment comprising:
- a deck including a top plate having an upper surface and an opposing lower surface;
- a cutting disk rotatably attached to the deck adjacent to the lower surface of the top plate, and including a top surface facing the lower surface of the top plate, and an opposing bottom surface positioned for engaging vegetation disposed on a ground surface;
- wherein the top plate includes an opening exposing the top surface of the cutting disk;
- a guide chute attached to the deck and operable to guide a log through the opening in the top plate for engaging the top surface of the cutting disk;
- wherein the guide chute includes a feed system operable to grasp and controllably feed the log through the opening in the top plate; and
- wherein the feed system includes a first roller rotatably mounted to the guide chute for rotation about a first roller axis.

38. The mulching and chipping attachment set forth in claim 37, wherein the guide chute includes an anvil that extends from the top plate toward the top surface of the cutting disk to define a chip cutting height, and wherein the anvil is selectively repositionable relative to the cutting disk to adjust the chip cutting height.

39. The mulching and chipping attachment set forth in claim 37, wherein the guide chute includes an anvil disposed at a rearward edge of the opening in the top plate and the anvil extends downwardly below the lower surface of the top plate to define a chip cutting height between a lower edge of the anvil and the top surface of the cutting disk.

40. The mulching and chipping attachment set forth in claim 37, wherein the feed system includes a second roller rotatably mounted to the guide chute, and wherein the first roller and the second roller are spaced from each other.

41. The mulching and chipping attachment set forth in claim 40, wherein at least one of the first roller and the second roller is moveable relative to the other one of the first roller and the second roller to adjust a throat distance between the first roller and the second roller.

42. A mulching and chipping attachment for a machine, the mulching and chipping attachment comprising:
- a deck including a top plate having an upper surface and an opposing lower surface;
- a cutting disk rotatably attached to the deck adjacent to the lower surface of the top plate, and including a top surface facing the lower surface of the top plate, and an opposing bottom surface positioned for engaging vegetation disposed on a ground surface;
- wherein the top plate includes an opening exposing the top surface of the cutting disk;
- a guide chute attached to the deck and operable to guide a log through the opening in the top plate for engaging the top surface of the cutting disk;
- wherein the guide chute includes a first side wall, a second side wall, and a top wall; and
- wherein at least a portion of the top wall is angled relative to the cutting disk to form an acute angle between the top wall of the guide chute and the top surface of the cutting disk.

43. The mulching and chipping attachment set forth in claim 42, wherein:
- the guide chute includes an anvil disposed adjacent to the opening and extends from the top plate toward the top surface of the cutting disk to define a chip cutting height between a lower edge of the anvil and an upper cutting element disposed on the top surface of the cutting disk; and
- the anvil is selectively repositionable relative to the cutting disk to adjust the chip cutting height.

44. The mulching and chipping attachment set forth in claim 43, wherein:
- the top plate includes a forward edge;
- the opening in the top plate includes a rearward edge spaced from the forward edge of the top plate;
- the acute angle is disposed adjacent to the rearward edge; and
- the anvil is disposed adjacent to the rearward edge of the opening.

* * * * *